J. R. HAMILTON.
AUTOMATICALLY LOCKING SHUT-OFF VALVE.
APPLICATION FILED AUG. 18, 1915.
1,222,397.
Patented Apr. 10, 1917.
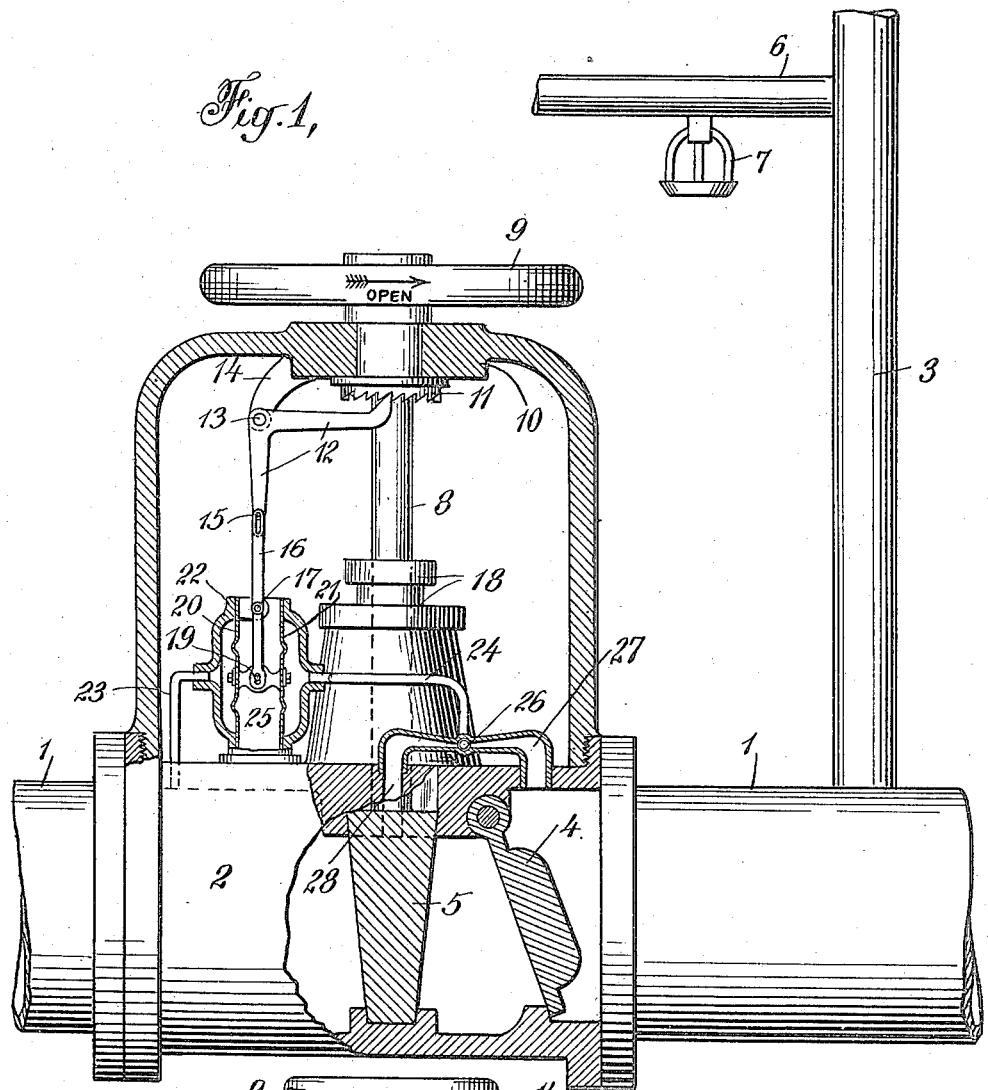
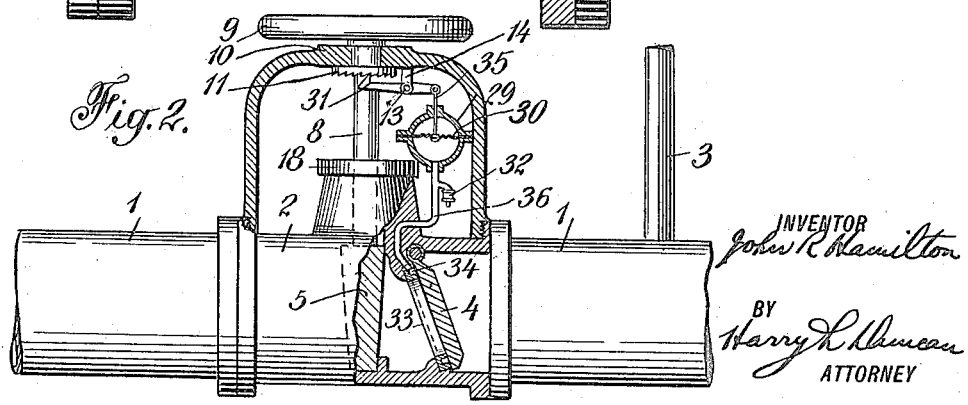
INVENTOR
John R. Hamilton
BY
Harry L. Duncan
ATTORNEY

UNITED STATES PATENT OFFICE.

JOHN R. HAMILTON, OF YONKERS, NEW YORK, ASSIGNOR TO SYPHO-CHEMICAL SPRINKLER CORPORATION, OF CROTON-ON-HUDSON, NEW YORK, A CORPORATION OF NEW YORK.

AUTOMATICALLY-LOCKING SHUT-OFF VALVE.

1,222,397.

Specification of Letters Patent.

Patented Apr. 10, 1917.

Application filed August 18, 1915. Serial No. 46,130.

*To all whom it may concern:*

Be it known that I, JOHN R. HAMILTON, a citizen of the United States, residing at Yonkers, county of Westchester, State of New York, have made a certain new and useful Invention Relating to Automatically-Locking Shut-Off Valves, of which the following is a specification, taken in connection with the accompanying drawing, forming part of the same.

This invention relates especially to automatically locking shut-off valves adapted for use in connection with chemical or other fire extinguishing systems or for other purposes and may comprise a shut-off valve for the system and a uni-directional locking device which allows the valve to be opened at any time but which under normal inoperative conditions of the connected system prevents the valve being shut, the locking device being automatically released by a pressure or flow control device so that under emergency conditions when water or other fluid is flowing past the valve it can be manually closed.

In the accompanying drawing showing in a somewhat diagrammatic way several illustrative embodiments of the invention, Figure 1 is an elevation, parts being shown in section; and Fig. 2 is a similar view showing another modification.

The valve may comprise a suitable casing 2 of any desired construction having flanges by which it can be connected in the supply pipe line 1 which may be used, for example, for supplying extinguishing liquid to a fire extinguishing system or for other emergency service, the connected fire extinguishing apparatus being shown as comprising a distributing system having one or more suitable distributing risers 3 and connected lines 6 and connected distributing devices, such as the automatic sprinkler heads 7, which may thus be mounted at any desired points around the building to be protected. The shut-off valve 5 may be mounted in any desired way within the casing 2 and operated by suitable operating devices such as the stem 8 and connected operating wheel or device 9 which may, if desired, have formed integral with or secured thereto the locking device or ratchet 11 shown as beneath the guide boss 10 on the inclosing casing which may be used to protect the control devices. The locking member or lever 12 may coöperate with this ratchet 11 and may be mounted on a pin 13 in the bracket 14 and its lower end may be connected in any suitable way with the control device which may comprise one or more diaphragms so connected to the valve or adjacent parts of the system as to be actuated when flow or other emergency action takes place. As indicated the control member has a loose pin and slot connection 15 with the locking lever and may be mounted about the pin 17 in the control device 5, the lower end of this lever having a loose pin and slot connection 19 with a connector or member 25 secured to one or more control diaphragms, such as 20, 21, which may be connected with a Venturi or other flow device in any suitable way so as to release the locking device when emergency flow takes place past the shut-off valve.

For this purpose a check valve, such as 4, may be mounted adjacent the shut-off valve and a suitable Venturi device arranged in the by-pass around this check valve as by providing the inlet passage 28 communicating with the Venturi throat 26 and with the outlet 27 so that when the shut-off valve is opened and flow takes place, the check valve offers sufficient resistance to this flow so as to cause liquid to flow through this Venturi by-pass and cause a relative suction at the Venturi throat which is communicated to the diaphragm 21 as by the suction pipe 24. In order to eliminate the possibility of accidental pressure variations affecting the control device a pressure diaphragm 20 may also be mounted in the diaphragm chamber 22 so as to be acted on by the pressure behind the check valve 4 which may act through the pressure pipe 23. Thus under emergency flow conditions the full pressure is exerted on the diaphragm 20 while the diaphragm 21 is only acted upon by the reduced pressure or suction occurring at the throat of the Venturi passage so that the diaphragms tend to move to the right, thus operating the control and locking levers and releasing the locking member from the ratchet so that the operating wheel may be turned in such direction as to close the shut-off valve so long as this emergency flow takes place.

Another arrangement is shown in Fig. 2 as comprising a similar inclosed locking device and control diaphragm member which may as indicated comprise a locking ratchet 11 and coöperating locking lever 31 pivoted about a pin 13 in the bracket 14 and having its free end connected to a stem, such as 35, to which is secured the control diaphragm 30 in the diaphragm chamber 29. This diaphragm chamber beneath the diaphragm is connected by the control pipe 36 with a seat aperture or channel 34 in the valve seat 33 with which the check valve 4 coöperates. In this way when the shut-off valve 5 is open and flow takes place into the distributing system and pipes 3, for instance, the check valve 4 is raised from its seat and fluid enters this seat channel so as to exert the full emergency pressure on the diaphragm 30, thus releasing the locking device so that the shut-off valve can be manually closed. It is desirable in order to prevent the momentary pressure impulse or flow due to water hammer, for instance, maintaining the locking device in released position to have a suitable drain or relief device 32 connected to this control pipe 36 so that the fluid may readily drain out through this relatively small aperture when the check valve is again seated.

This invention has been described in connection with a number of illustrative embodiments, forms, arrangements, materials, proportions, sizes and parts of the apparatus, to the details of which disclosure the invention is not of course to be limited, since what is claimed as new and what is desired to be secured by Letters Patent is set forth in the appended claims:

1. In automatic shut-off valves, a valve casing, a shut-off valve mounted in said casing, a check valve mounted in said casing adjacent said shut-off valve, an operating device for said shut-off valve comprising a wheel and stem, a locking device connected to said operating device and comprising a locking ratchet and coöperating locking lever, a diaphragm control device connected to the locking lever of said locking device and having a suction diaphragm, a Venturi passage arranged in a by-pass around said check valve and having its restricted throat in communication with said suction diaphragm, an opposed pressure diaphragm connected to said suction diaphragm and in communication with said valve casing behind said check valve to thereby effect the release of said locking device when the flow occurs past said check valve.

2. In automatic shut-off valves, a valve casing, a shut-off valve mounted in said casing, a check valve mounted in said casing adjacent said shut-off valve, an operating device for said shut-off valve, a locking device connected to said operating device and comprising a locking ratchet and coöperating locking lever, a diaphragm control device connected to the locking lever of said locking device and having a suction diaphragm, a Venturi passage arranged in a by-pass around said check valve and in communication with said suction diaphragm, an opposed pressure diaphragm connected to said suction diaphragm and in communication with said valve casing behind said check valve to thereby effect the release of said locking device when the flow occurs past said check valve.

3. In automatic shut-off valves, a valve casing, a shut-off valve mounted in said casing, a check valve mounted in said casing adjacent said shut-off valve, an operating device for said shut-off valve, a locking device connected to said operating device, a diaphragm control device connected to said locking device and having a suction diaphragm, a Venturi passage arranged in a by-pass around said check valve and in communication with said suction diaphragm to thereby effect the release of said locking device when the flow occurs past said check valve.

4. In automatic shut-off valves, a valve casing, a shut-off valve mounted in said casing, a check valve mounted in said casing adjacent said shut-off valve, an operating device for said shut-off valve, a locking device connected to said operating device and comprising a locking ratchet and coöperating locking lever and a diaphragm control device connected to said locking device and connected to said valve casing adjacent said check valve to thereby effect the release of said locking device when the flow occurs past said check valve.

5. In automatic shut-off valves, a valve casing, a shut-off valve mounted in said casing, a check valve mounted in said casing adjacent said shut-off valve, an operating device for said shut-off valve, a locking device connected to said operating device and a diaphragm control device connected to said locking device and connected to said valve casing adjacent said check valve to thereby effect the release of said locking device when the flow occurs past said check valve.

6. In automatic shut-off valves adapted for use in automatic fire extinguishing apparatus, a valve casing, a shut-off valve mounted in said casing, an operating device for said shut-off valve, a locking device connected to said operating device and a control device connected to said locking device and connected to said valve casing to thereby effect the release of said locking device under emergency conditions.

7. In automatic shut-off valves, a valve casing, a shut-off valve mounted in said casing, an operating device for said shut-off valve a normally acting locking device connected to said operating device, a control device connected to said locking device and comprising a Venturi flow device connected to said casing and connected to said control device to effect the release of said locking device when the flow occurs.

8. In automatic shut-off valves, a valve casing, a shut-off valve mounted in said casing, an operating device for said shut-off valve, a locking device connected to said operating device, a control device connected to said locking device and comprising a flow device connected to said casing and connected to said control device to effect the release of said locking device when the flow occurs.

9. In automatic shut-off valves adapted for use in automatic fire extinguishing apparatus, a valve casing, a shut-off valve mounted in said casing, a manually actuated closing device for said shut-off valve, a locking device connected to said closing device and normally preventing its operation and a control device connected to said locking device and actuated by fluid conditions within said casing to effect the automatic release of said locking device.

10. In automatic shut-off valves, a valve casing, a shut-off valve mounted in said casing, a closing device for said shut-off valve, a locking device connected to said closing device and normally preventing its operation and a control device connected to said locking device and adapted to be actuated by fluid conditions in the piping communicating with said casing to release said locking device.

JOHN R. HAMILTON.

Witnesses:
W. G. LOGEZ,
A. J. HAMPSON.

Copies of this patent may be obtained for five cents each, by addressing the "Commissioner of Patents, Washington, D. C."